(12) United States Patent
Reich et al.

(10) Patent No.: US 7,722,111 B2
(45) Date of Patent: May 25, 2010

(54) TRUCK BOX WITH EXTERNAL STORAGE STRUCTURAL FRAME

(75) Inventors: Alan Reich, Farmington, MI (US);
Mark F. Werner, LaSalle (CA);
Gianfranco Gabbianelli, Troy, MI (US)

(73) Assignee: Magna International Inc., Aurora, Ontario (CA)

( * ) Notice: Subject to any disclaimer, the term of this patent is extended or adjusted under 35 U.S.C. 154(b) by 7 days.

(21) Appl. No.: 12/179,625

(22) Filed: Jul. 25, 2008

(65) Prior Publication Data
US 2009/0026786 A1    Jan. 29, 2009

Related U.S. Application Data

(60) Provisional application No. 60/952,080, filed on Jul. 26, 2007.

(51) Int. Cl.
*B62D 33/02*    (2006.01)
(52) U.S. Cl. .................... 296/183.1; 296/37.6
(58) Field of Classification Search ............. 296/183.1, 296/183.2, 37.6
See application file for complete search history.

(56) References Cited

U.S. PATENT DOCUMENTS

| | | | |
|---|---|---|---|
| 6,089,639 A * | 7/2000 | Wojnowski | 296/37.6 |
| 6,099,070 A * | 8/2000 | Yocum | 296/182.1 |
| 6,237,211 B1 * | 5/2001 | Clare et al. | 29/434 |
| 6,702,365 B2 * | 3/2004 | Semple et al. | 296/183.1 |
| 6,742,832 B1 * | 6/2004 | Miskech et al. | 296/183.1 |
| 6,814,397 B2 * | 11/2004 | Henderson et al. | 296/184.1 |
| 7,222,913 B2 * | 5/2007 | Womack et al. | 296/205 |
| 7,322,640 B2 * | 1/2008 | Ni et al. | 296/204 |
| 7,562,925 B2 * | 7/2009 | Henderson et al. | 296/37.6 |
| 2001/0038230 A1 * | 11/2001 | Clare et al. | 296/189 |
| 2001/0050491 A1 * | 12/2001 | Clare et al. | 296/37.6 |
| 2007/0267885 A1 * | 11/2007 | Thelen et al. | 296/37.6 |
| 2007/0267896 A1 | 11/2007 | Werner | |
| 2008/0308591 A1 * | 12/2008 | Henderson et al. | 224/404 |
| 2009/0045646 A1 * | 2/2009 | Clare et al. | 296/37.6 |

* cited by examiner

*Primary Examiner*—Jason S Morrow
(74) *Attorney, Agent, or Firm*—Harness, Dickey & Pierce P.L.C.

(57) ABSTRACT

A truck box includes front and rear corner brackets and an inner side panel having a first end fixed to the front corner bracket and a second end fixed to the rear corner bracket. A rail longitudinally extends substantially the entire length of the inner side panel and has a first end fixed to the front corner bracket and a second end fixed to the rear corner bracket. The rail has a center portion fixed to the inner side panel. The first and second ends of the rail are transversely offset and spaced apart from the inner side panel.

20 Claims, 10 Drawing Sheets

TRUCK BOX WITH EXTERNAL STORAGE STRUCTURAL FRAME

This application claims the benefit of U.S. Provisional Application No. 60/952,080, filed Jul. 26, 2007.

FIELD

The present disclosure relates to a motor vehicle cargo bed and, more specifically, to a truck box with a structural frame for external storage.

BACKGROUND

The statements in this section merely provide background information related to the present disclosure and may not constitute prior art.

Conventional truck box architecture consists of a unitized box where box side inner panels, outer panels, a header panel and a floorpan function as a system to provide the overall box stiffness and structural performance characteristics. Typically the truck box is constructed from stamped steel panels with stamped or roll-formed lateral steel cross-members to support the floor. The conventional design relies on the contribution of the box sides for the overall structural performance. Without the contribution from the box sides, the floor and lateral cross-members provide very little torsional and bending stiffness on their own.

SUMMARY

The present disclosure provides a truck box including a floor pan with laterally extending floor cross-members fixed to the floor pan and cross-member close-out brackets fixed to the cross-members. The truck box also includes a substantially vertically oriented inner side panel having each of the cross-member close-out brackets fixed thereto.

The present disclosure also provides a truck box including front and rear corner brackets and an inner side panel having a first end fixed to the front corner bracket and a second end fixed to the rear corner bracket. A rail longitudinally extends substantially the entire length of the inner side panel and has a first end fixed to the front corner bracket and a second end fixed to the rear corner bracket. The rail has a center portion fixed to the inner side panel. The first and second ends of the rail are transversely offset and spaced apart from the inner side panel.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
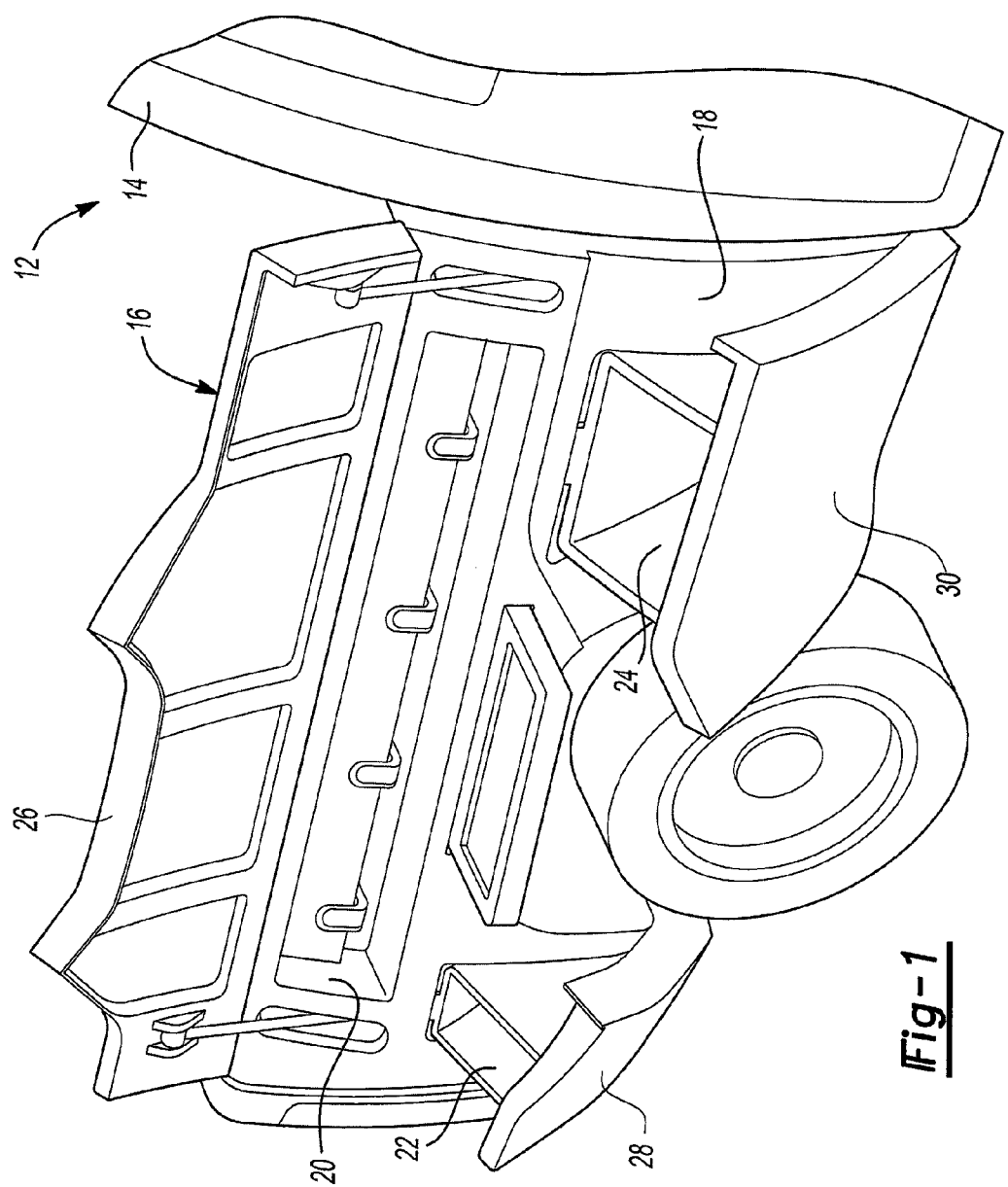
FIG. 1 is a fragmentary perspective view of an exemplary vehicle equipped with a truck box having an external storage structural frame.

The following description is merely exemplary in nature and is not intended to limit the present disclosure, application, or uses. It should be understood that throughout the drawings, corresponding reference numerals indicate like or corresponding parts and features.

With reference to FIG. 1, a motor vehicle 12 is shown including a cab 14 and a truck box assembly 16. Cab 14 and truck box assembly 16 may be mounted to a truck frame (not shown). Truck box assembly 16 may include body side storage modules 18 defining a first storage compartment 20, a second storage compartment 22 and a third storage compartment 24. Access to the various storage compartments may be given by rotating, removing or sliding one of storage compartment covers 26, 28, 30 associated with the respective storage compartments 20, 22, 24. To provide the truck box assembly with desired stiffness and structural performance characteristics, truck box assembly 16 may include a header assembly 32, a floor panel assembly 34, side panels 36, front corner assemblies 38, rear corner assemblies 40, cleat rails 42, inner panel reinforcements 44 and outer panel rail assemblies 46 shown in FIG. 2.

Figure 3:
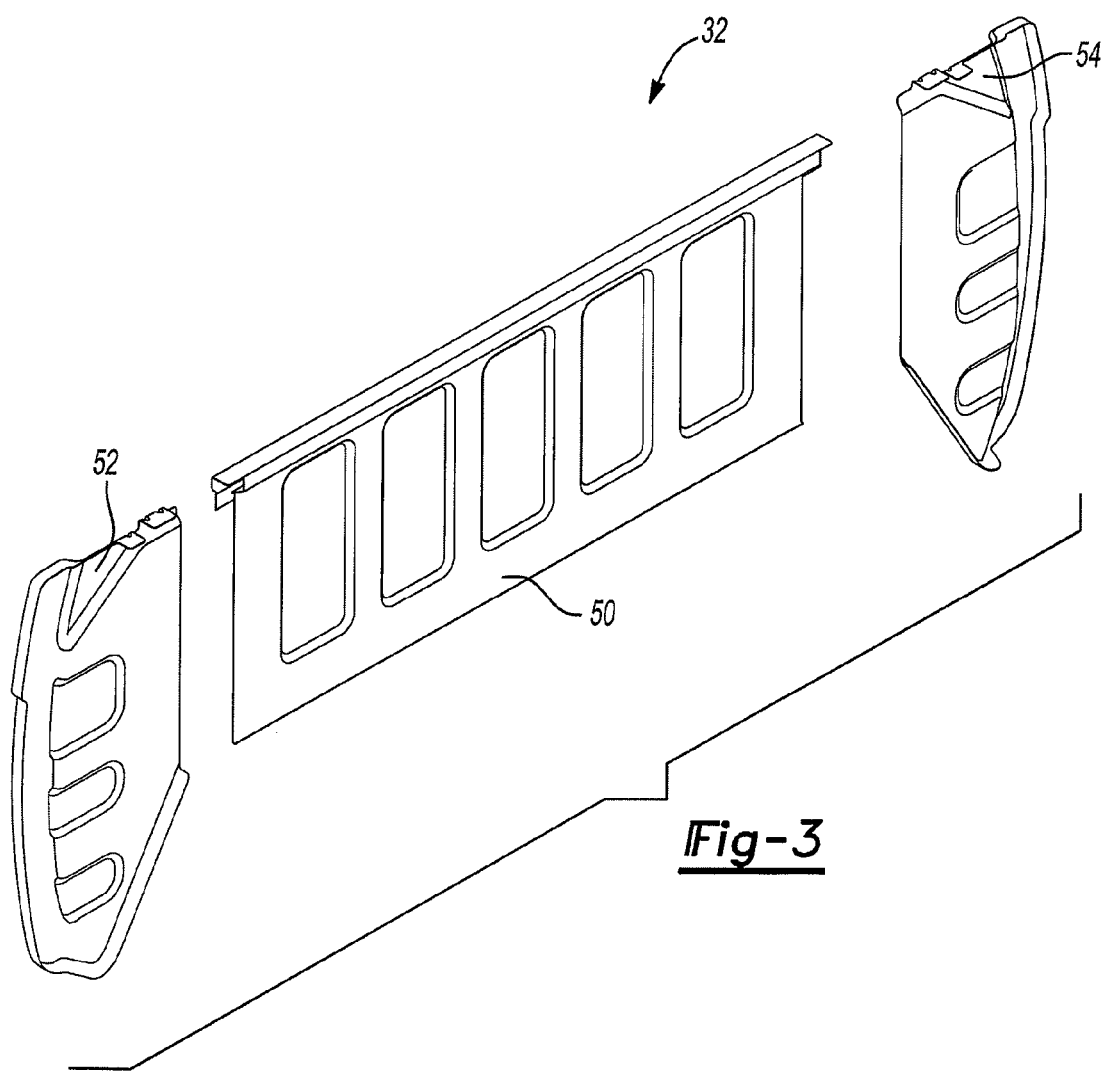
FIG. 3 is an exploded perspective view of a header panel assembly.

FIG. 3 depicts header assembly 32 including a header panel 50, a left-hand header close-out panel 52 and a right-hand header close-out panel 54. Each of the panels may be constructed from steel sheets by a stamping method. Panels 50, 52, and 54 are interconnected to one another by a spot welding process. While most of the panel interconnections described within this paper will be described as spot welded connections, it should be appreciated that other fastening methods including riveting, screwing, crimping, clamping, other methods of welding and adhesive bonding are contemplated as being within the scope of the present disclosure.

Figure 4:
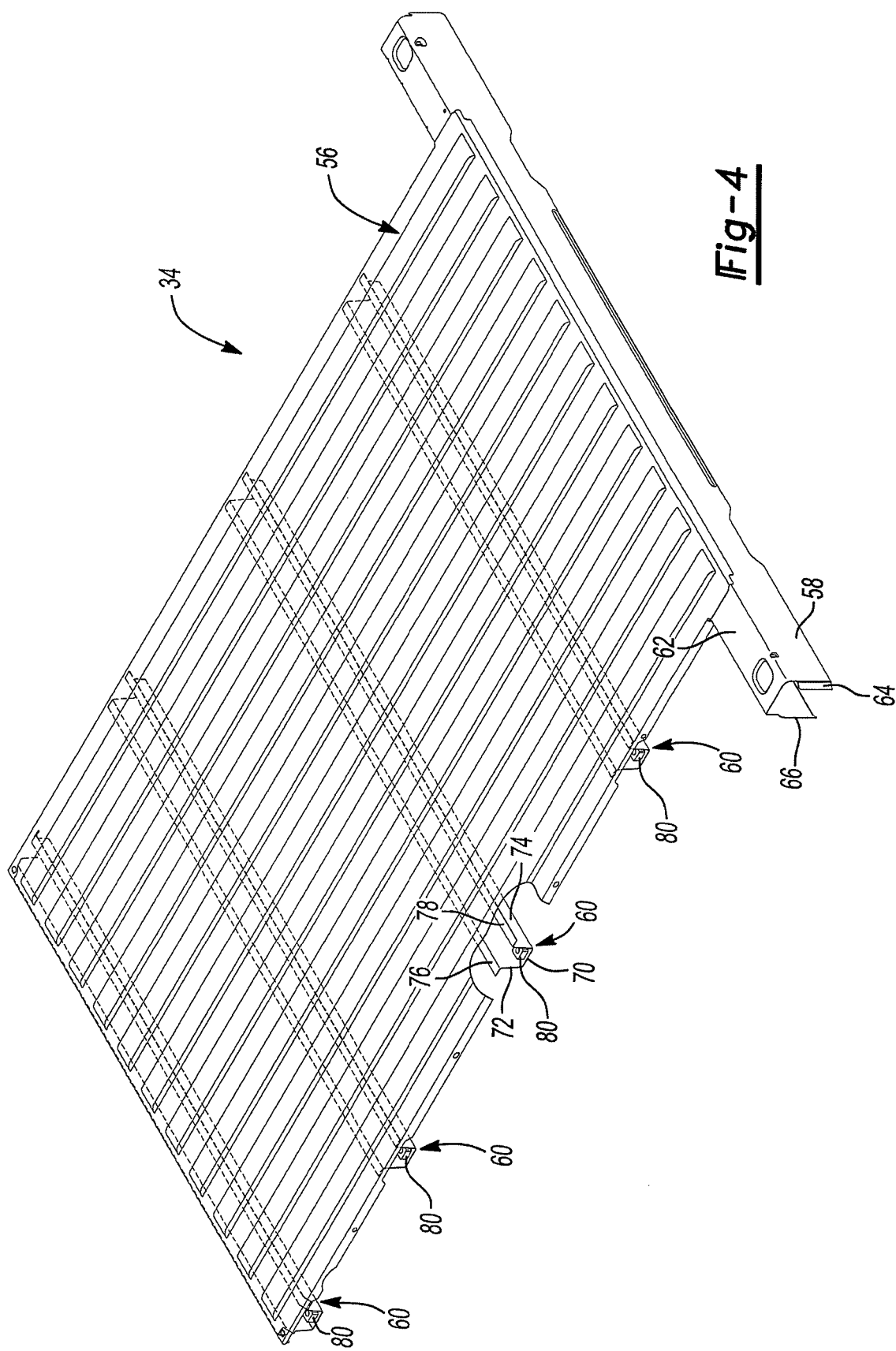
FIG. 4 is a fragmentary perspective view of a floor panel assembly.

FIG. 4 depicts floor panel assembly 34 including a floor panel 56, a rear sill 58 and a plurality of cross members 60. Floor panel 56 is a substantially planar member having a corrugated shape stamped therein. Rear sill 58 is an elongated member having a substantially "U"-shaped cross section. In particular, rear sill 58 includes an end wall 62 interconnecting first and second vertically oriented side walls 64, 66. End wall 62 is spot welded to floor panel 56.

Each cross member 60 is an elongated channel-shaped member having a bottom wall 70 interconnecting first and second side walls 72, 74. A first flange 76 extends outwardly from first side wall 72. A second flange 78 extends outwardly from second side wall 74. First and second flanges 76, 78 are aligned substantially parallel with one another and are each spot welded to floor panel 56. It should be appreciated that rear sill 58 and cross-members 60 may be stamped or roll-formed from steel. At least one cross-member 60 includes a weld nut 80 fixed thereto. Weld nut 80 includes an internal thread for threaded engagement with a fastener (not shown) used to interconnect the vehicle frame with truck box assembly 16.

Figure 5:
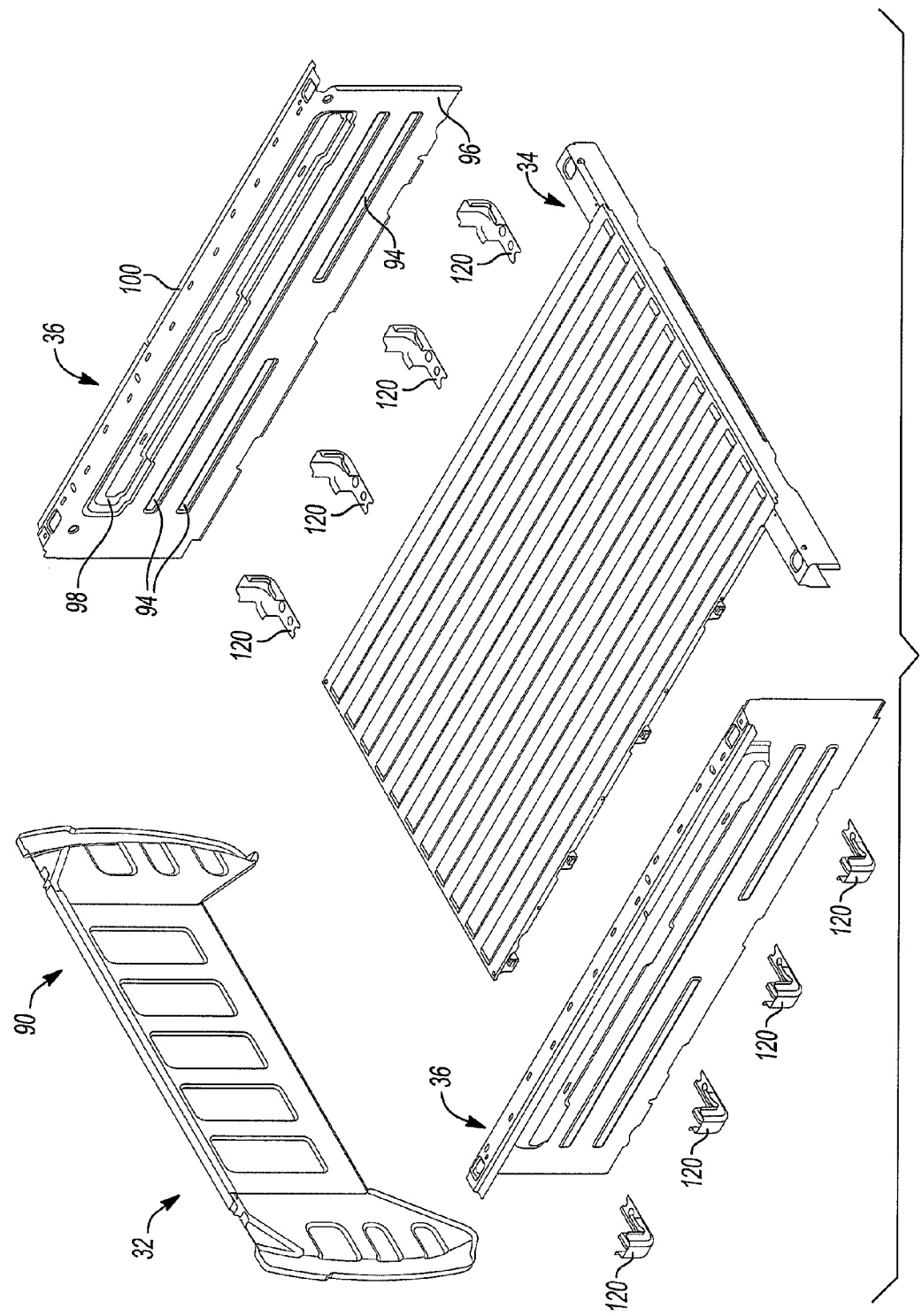
FIG. 5 is a partial exploded perspective view of the external storage structural frame.
Figure 6:
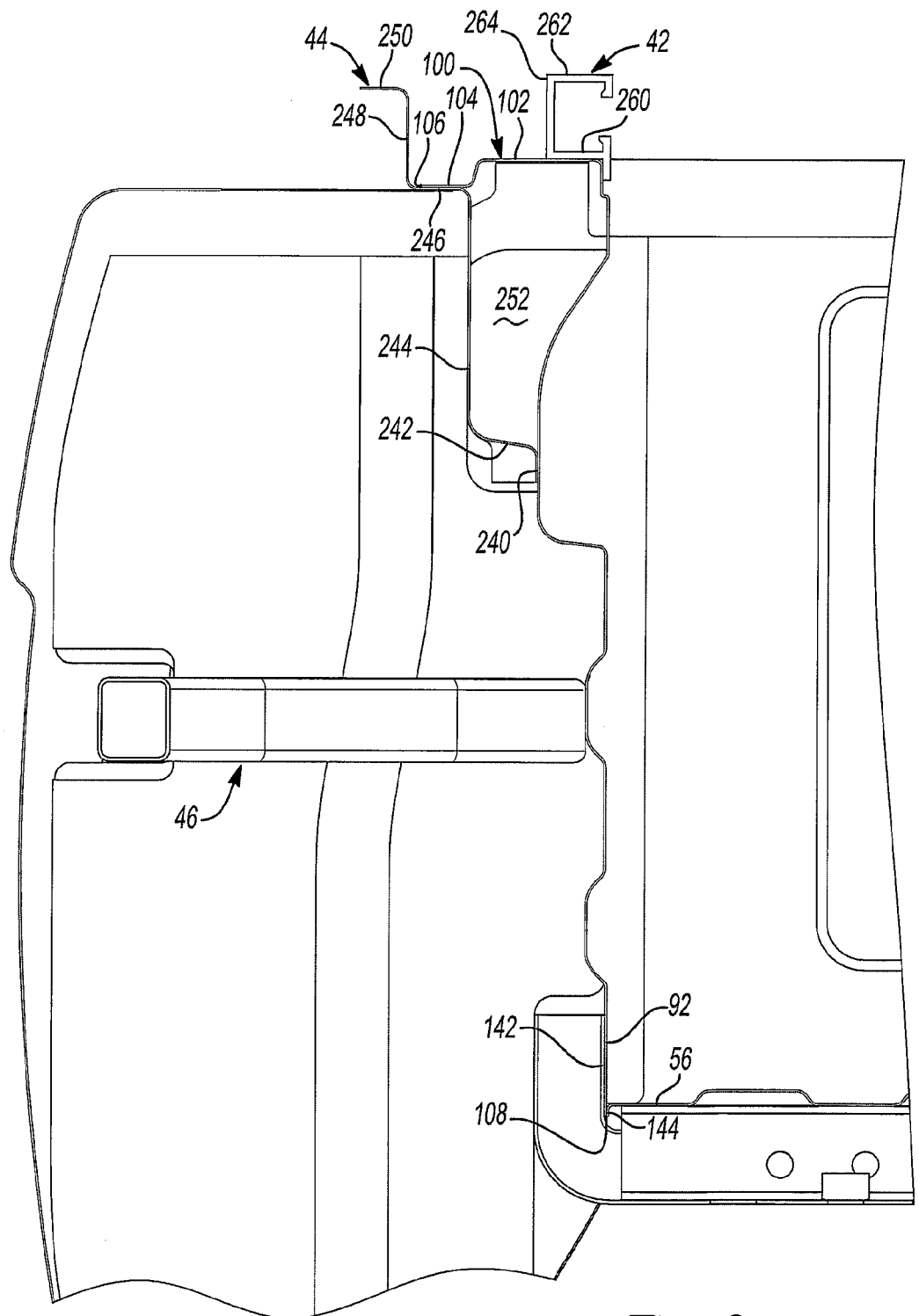
FIG. 6 is a cross-sectional view of the external storage structural frame.

To begin construction of truck box assembly 16, header panel assembly 32, floor panel assembly 34 and side panels 36 are interconnected to one another to form a body side, header and floor subassembly 90, as shown in FIGS. 5 and 6. Each side panel 36 may be stamped from a steel sheet to include a substantially vertically oriented inner wall 92 having a plurality of recessed portions 94 extending transversely outward from an inner surface 96 of inner wall 92. Another recessed portion 98 extends transversely outwardly a greater distance than recessed portions 94. Furthermore, recessed portion 98 may longitudinally extend along substantially the entire length of side panel 36. A flange 100 transversely outwardly extends from inner wall 92. Flange 100 includes a first portion 102 and a second portion 104. First portion 102 is substantially planar and is positioned a greater distance from floor panel 56 than second portion 104. Second portion 104 is also substantially planar and positioned offset and parallel to first portion 102. Second portion 104 includes an edge 106 defining the transverse outward extremity of side panel 36. An opposite edge 108 defines another boundary of side panel 36.

Figure 7:
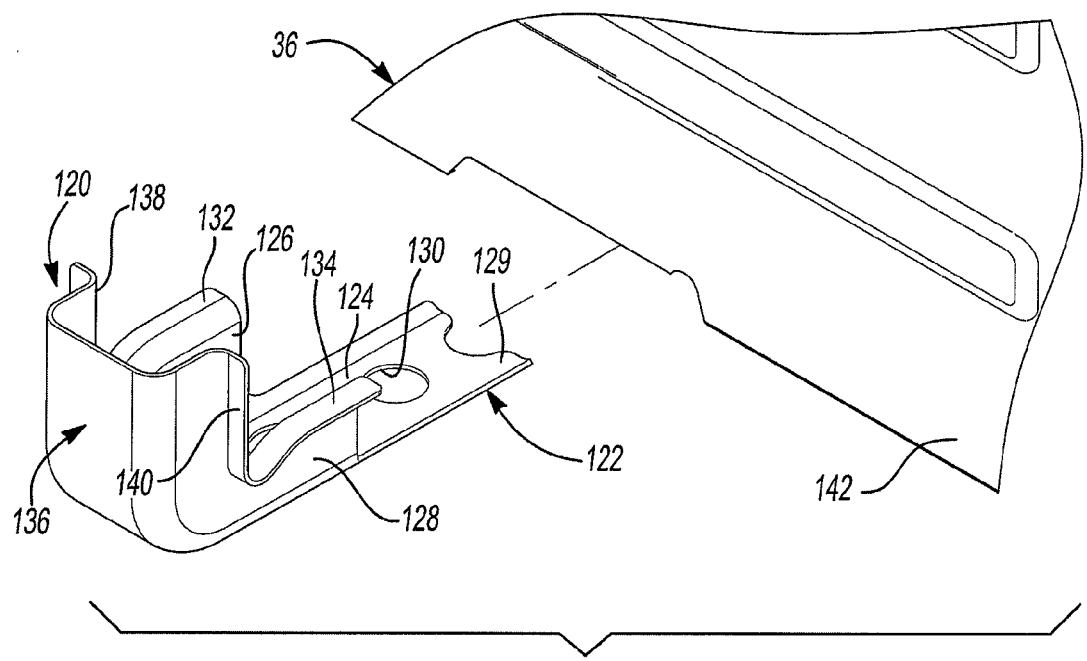
FIG. 7 is a fragmentary exploded perspective view of a portion of the external storage structural frame.

A plurality of cross-member close-outs 120 interconnect side panels 36 with floor panel 56 and cross members 60. As shown in FIG. 7, each cross-member close-out 120 is shaped as an open channel having a 90 degree bend. A first leg 122 includes a bottom wall 124 interconnecting a first side wall 126 with a second side wall 128. Bottom wall 124 extends transversely inwardly a greater distance than side walls 126, 128 to form a pad 129. First leg 122 is sized and shaped as a pocket to receive a portion of cross member 60 therein. One of apertures 130 formed within bottom wall 124 is aligned with nut 80 to allow the attachment fastener to extend therethrough to couple the vehicle frame to cross member 60. A first flange 132 longitudinally extends from first side wall 126. Similarly, a flange 134 longitudinally extends from second side wall 128. Flanges 132 and 134 are positioned coplanar with one another and spot welded to floor panel 56. A second leg 136 of cross member close-out 120 includes a vertically oriented portion of bottom wall 124 as well as vertically oriented portions of first side wall 126 and second side wall 128. A third flange 138 longitudinally extends from first side wall 126. A fourth flange 140 longitudinally extends from second side wall 128 in the opposite direction. Third flange 138 and fourth flange 140 are spot welded to an outer surface 142 of side panel 36. To complete body side header and floor subassembly 90, panel assembly 32 is spot welded to each of side panels 36. A bottom portion of inner wall 92 proximate edge 108 is spot welded to a downturned flange 144 of floor panel 56 along a majority of the length of side panel 36.

Figure 8:
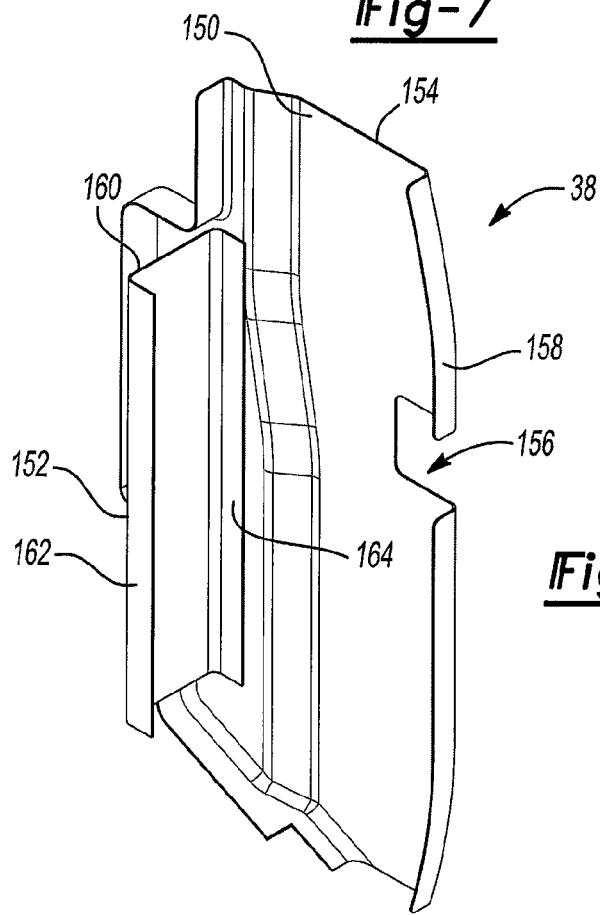
FIG. 8 is a perspective view of a front corner assembly of the external storage structural frame.

FIG. 8 depicts one of front corner assemblies 38 having a front bin close-out bracket 150 spot welded to a front pillar close-out bracket 152. Front bin close-out bracket 150 includes a substantially planar body section 154 having a notch 156. An upturned flange 158 extends about a majority of perimeter of body section 154. Front pillar close-out bracket 152 is a channel shaped member having side wall 160 interconnecting a pair of spaced apart upturned side walls 162, 164. Side wall 164 is spot welded to body section 154 to complete front corner assembly 38.

Figure 9:
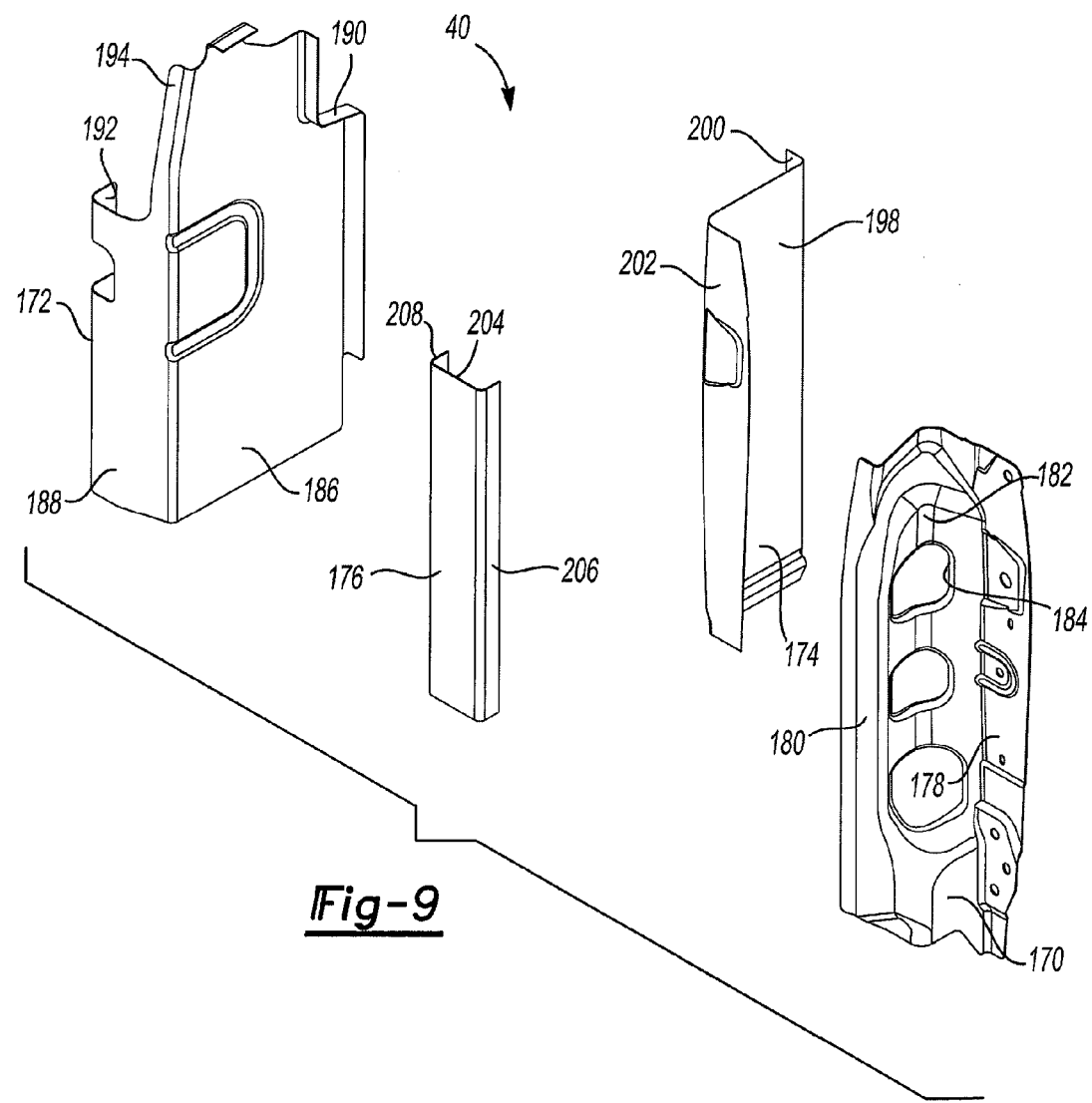
FIG. 9 is an exploded perspective view of a rear corner assembly of the external storage structural frame.

FIG. 9 illustrates one of rear corner assemblies 40. Each rear corner assembly is substantially similar to the other except that the components are symmetrically opposite. Accordingly, only one rear corner assembly 40 will be described in detail. Rear corner assembly 40 includes a tail lamp bracket 170, a rear bin close-out bracket 172, a rear pillar close-out bracket 174 and a rear pillar bulkhead reinforcement 176. Tail lamp bracket 170 is shaped as a contoured three-dimensional steel sheet having a first longitudinally extending flange 178 and a second longitudinally extending flange 180 interconnected by a substantially transversely extending contoured center portion 182. First and second flange 178, 180 are substantially planar portions of tail lamp bracket 170 that extend substantially parallel to one another. A plurality of apertures 184 extend through center portion 182.

Rear bin close-out bracket 172 is another stamped steel panel having a substantially planar transversely extending first portion 186 and a longitudinally extending second planar portion 188. An upturned flange 190 is formed on one edge of first portion 186. A transversely extending tab 192 inwardly extends from second planar portion 188. A longitudinally extending flange 194 extends from second portion 188 at an angle less than 45 degrees and also extends from first portion 186 at 90 degrees. Second portion 188 and flange 194 define a contoured shape that matches the shape of second flange 180. Tail lamp bracket 170 and rear bin close-out bracket 172 are spot welded to each other along an interface of these contours.

Rear pillar close-out bracket 174 is another stamped steel panel having a substantially "Z"-shaped cross section. In particular, rear pillar close-out bracket 174 includes a main body panel 198 having a first flange 200 longitudinally extending in a first direction from one edge as well as a second flange 202 longitudinally extending in an opposite direction compared to flange 200. Rear pillar bulkhead reinforcement 176 is a substantially "U"-shaped channel having a longitudinally extending wall 204 interconnecting transversely extending side walls 206, 208. As shown in the Figures, various flanges of rear pillar close-out bracket 174 and rear pillar bulkhead reinforcement 176 are spot welded to rear bin close-out bracket 172 and tail lamp bracket 170 to define a column shaped structure having a hollow center. The closed column shape forms a very rigid structure resistant to torsion and bending.

Figure 10:
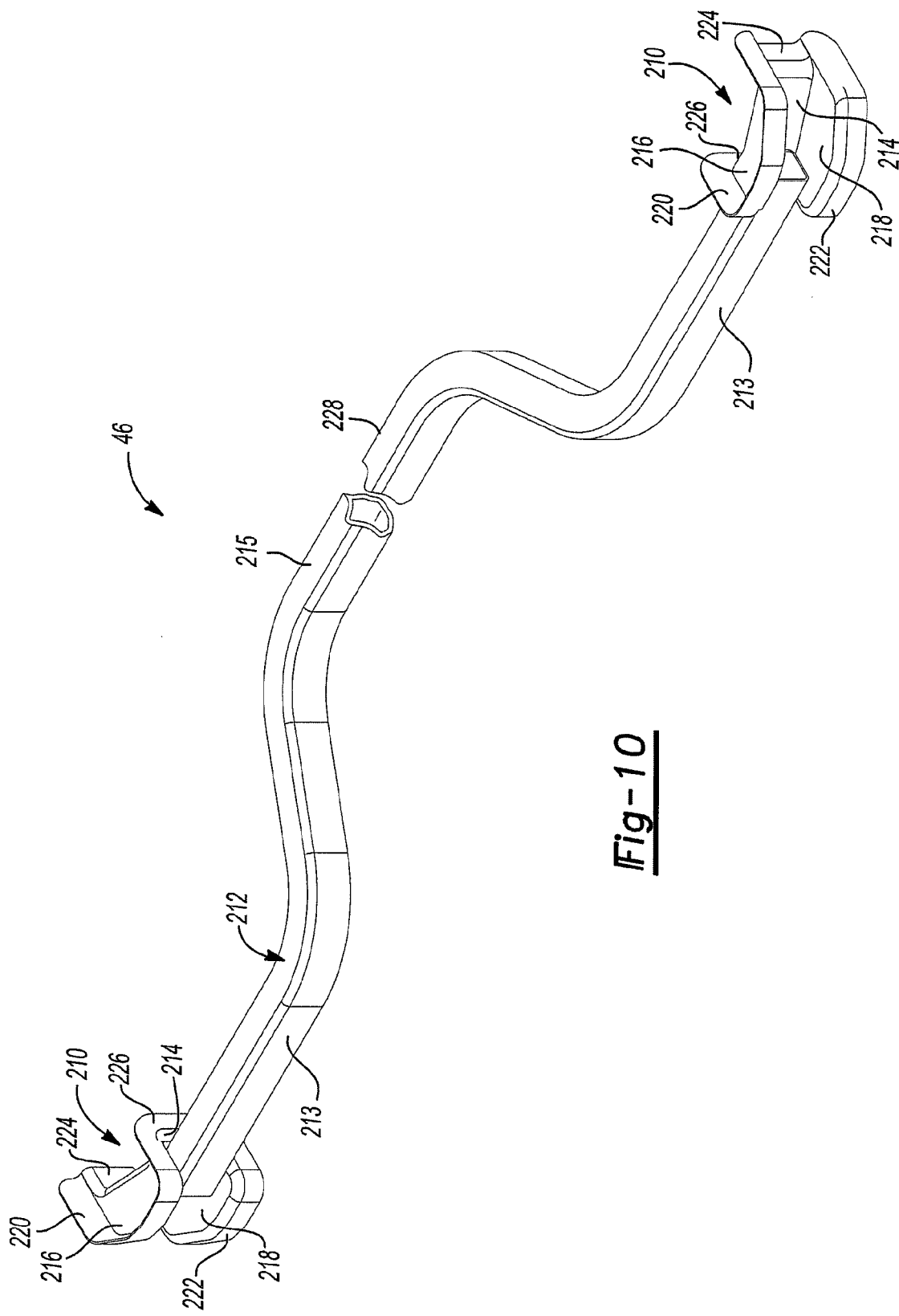
FIG. 10 is a perspective view of an outer panel rail assembly.

FIG. 10 depicts one of outer panel rail assemblies 46. The outer panel rail assemblies are substantially identical to one another other than being symmetrically opposite. However, the left-hand and right-hand sides of truck box assembly 16 do not necessarily have to be symmetrical. Different storage configurations may be provided on each side of the truck box. For purposes of discussion clarity, only one outer panel assembly 46 will be described in detail. Outer panel rail assembly 46 includes a pair of rail brackets 210 coupled to opposite ends of an outer panel reinforcement rail 212. Outer panel reinforcement rail 212 may be formed as a bent tube having a substantially rectangular outer shape. Rail 212 includes end portions 213 longitudinally extending at positions outboard of a longitudinally extending center portion 215.

Each rail bracket 210 has a substantially "C"-shaped cross section with a longitudinally extending side wall 214 interconnecting an upper wall 216 and a lower wall 218. A vertically extending upper flange 220 extends about the periphery of upper wall 216. Similarly, a lower flange 222 extends vertically downwardly about the periphery of lower wall 218. Transversely extending flanges 224 and 226 inwardly extend from side wall 214. Upper wall 216 and lower wall 218 are substantially planar portions of rail bracket 210 spaced apart from and extending substantially parallel to one another. Side wall 214, upper wall 216 and lower wall 218 define a pocket in receipt of a portion of rail 212. An outer surface 228 of rail 212 is spot welded to side wall 214. The other rail bracket 210 is similarly spot welded to the other end of rail 212 to form outer panel rail assembly 46.

Figure 2:
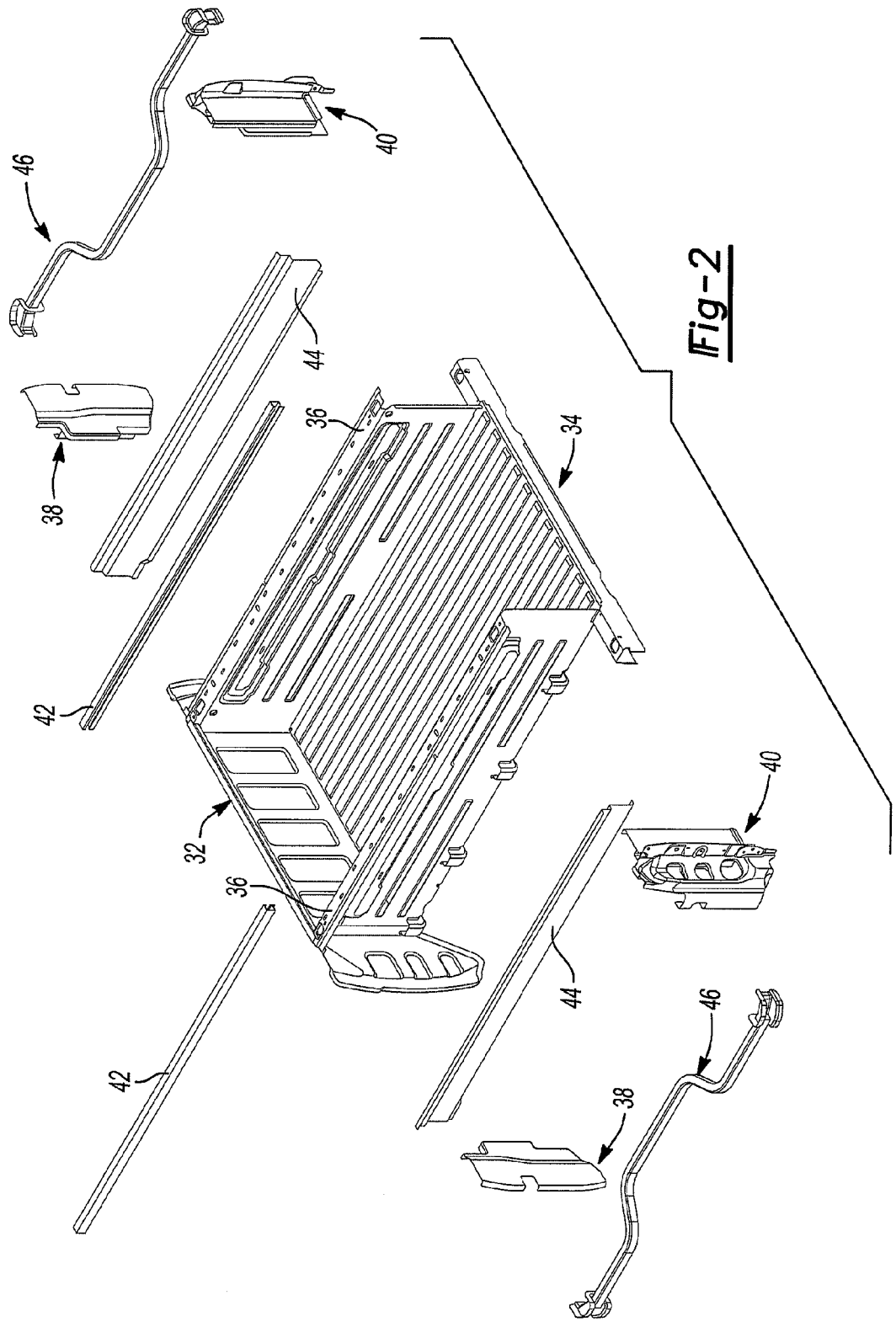
FIG. 2 is an exploded perspective view of the external storage structural frame.

As shown in FIGS. 2 and 6, truck box assembly 16 is further defined by spot welding inner panel reinforcements 44 to side panels 36. Each inner panel reinforcement 44 is substantially the mirror image of the other. Accordingly, only one inner panel reinforcement 44 will be described in detail. Inner panel reinforcement 44 may be an elongated steel sheet having a stepped profile. In particular, inner panel reinforcement 44 includes a lower vertically oriented portion 240 adjoining a horizontally oriented portion 242. Another vertically oriented portion 244 extends upwardly from portion 242. Another horizontally oriented portion 246 extends transversely outwardly from vertically oriented portion 244. Another vertically oriented portion 248 extends upwardly from portion 244. A transversely outwardly extending flange 250 extends from portion 248. The size and shapes of various stacked portions of inner panel reinforcement 44 correspond to a size and shape of the various portions of side panel 36 such that portion 240 is spot welded to outer surface 142 of side panel 36 at recessed portion 98. Similarly, second portion 104 of side panel 36 is spot welded to transversely extending portion 246 of inner panel reinforcement 44. An enclosed or boxed cavity 252 is defined by side panel 36 and inner panel reinforcement 44. As previously mentioned, formation of such a boxed section or column shaped structure is very rigid resisting torsion and bending.

Cleat rails 42 are also substantially symmetrically opposite to one another and only one will be described in detail. Cleat rails 42 may be constructed as aluminum extrusions and fixed to side panels 36 with mechanical fasteners (not shown). Cleat rail 42 has a substantially "C"-shaped cross section having a bottom leg 260 engaging first portion 102 of side panel 36, a second leg 262 extending substantially parallel to first leg 260 and spaced apart therefrom as well as a vertically oriented section 264 interconnecting first leg 260 and second leg 262. Second leg 262 and transversely extending portion 250 of inner panel reinforcement 44 are positioned substantially co-planar with one another to support a top cap (not shown).

At this level of subassembly, front corner assembly 38, outer panel rail assembly and rear corner assembly 40 are moved in position for interconnection and spot weldment. For example, the leading end of outer panel rail assembly 46 is positioned adjacent to header panel assembly 32 and front corner assembly 38. A portion of rail 212 is positioned within slot 156 of front bin close-out bracket 150. Upper flange 220 and lower flange 222 are spot welded to header panel assembly 32 and front corner assembly 38. Similarly, rail bracket 210 coupled to a rearward end of outer panel rail assembly 46 is positioned adjacent to rear corner assembly 40. Flanges 220 and 222 are spot welded to upturned flange 190 and second flange 180 of rear bin close-out bracket 172. Inward surface 228 of rail 212 is fixed to outer surface 142 of side panel 36 via spot welding for the length of offset portion 215. Offset portion 215 is longitudinally positioned to correspond to the location of a vehicle wheel and tire assembly.

Furthermore, rear corner assembly 40 is fixed to body side header and floor subassembly 90. For example, flange 200 may be spot welded to side panel 36. At this time, truck box assembly 16 may be completed by fastening body side storage modules 18, top caps and a tailgate (not shown).

Figure 11:
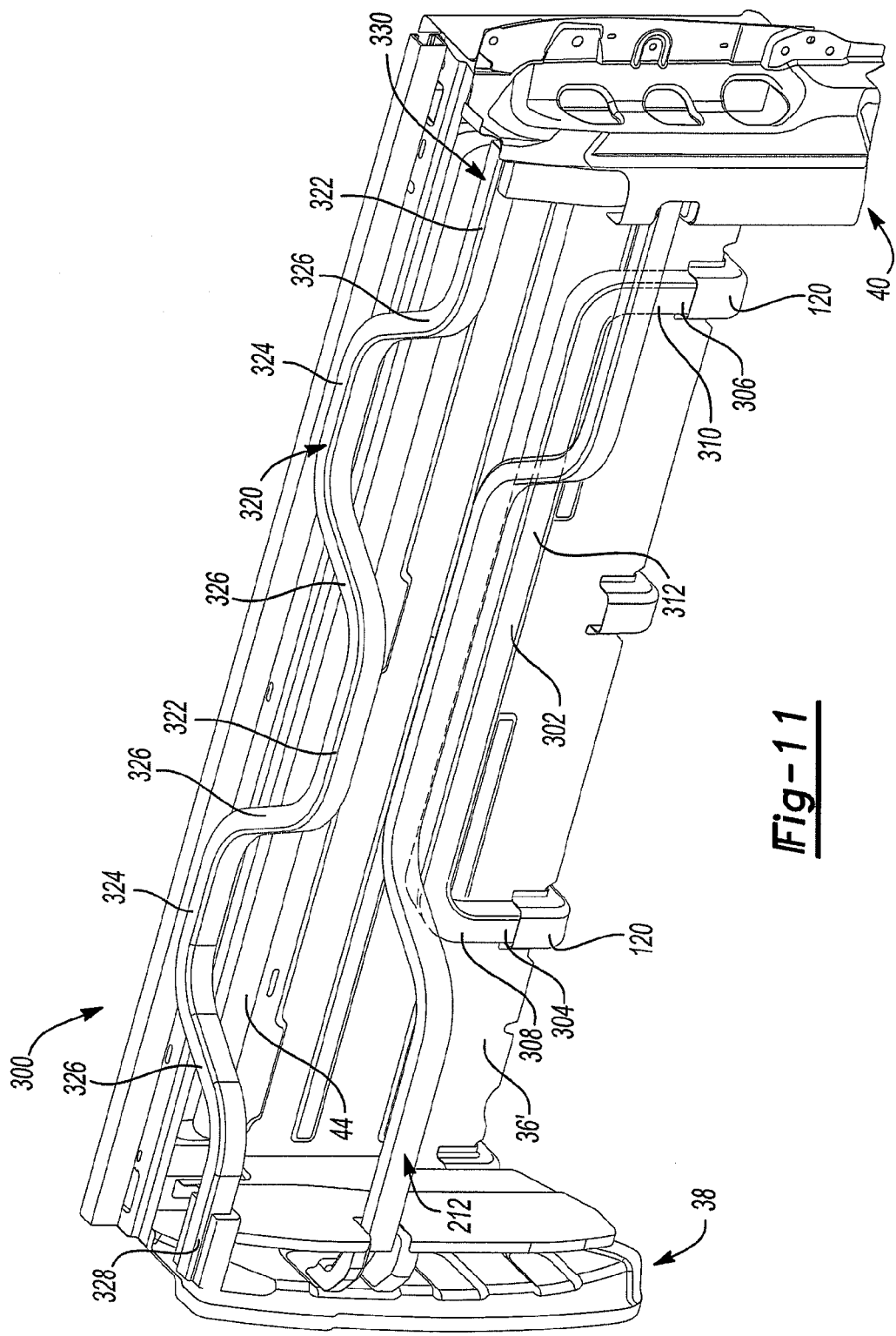
FIG. 11 is a partial perspective view of another external storage structural frame.

FIG. 11 depicts an alternate embodiment truck box assembly 300 substantially similar to truck box assembly 16. Accordingly, like elements will retain their previously introduced reference numerals. Truck box assembly 300 includes a reinforcement tube 302 formed as a substantially "U"-shaped member. Reinforcement tube 302 may be a bent tube substantially similar to rail 212. A first end 304 of reinforcement tube 302 is fixed to one of cross-member close-out 120. An opposite end 306 of reinforcement tube 302 is fixed to another cross-member close-out 120. Reinforcement tube 302 includes a first substantially vertically extending section 308 and a second substantially vertically extending section 310 interconnected by a substantially horizontally and longitudinally extending portion 312. Portion 312 is fixed to a bottom surface of offset portion 215 of rail 212. In one example, rail 212 is welded to reinforcement tube 302. By adding reinforcement tube 302 and interconnecting rail 212 to reinforcement tube 302, it is contemplated that rail 212 need not be welded to side panel 36'. Therefore, side panel 36' may be constructed from a non-metallic material. Side panel 36' may be mechanically fastened with screws, rivets or may be adhesively bonded to rail 212 or reinforcement tube 302. Alternatively, side panel 36' may not be mechanically coupled to either rail 212 or reinforcement tube 302.

An upper rail 320 is also depicted as part of truck box assembly 300. One skilled in the art should appreciate that upper rail 320 need not be used in combination with reinforcement tube 302 but both components are depicted in FIG. 11 for simplicity of description. Upper rail 320 may be a bent tube having a serpentine shape as depicted in the Figure. Upper rail 320 includes a plurality of outboard linear portions 322 and a plurality of inboard linear portions 324. Substantially transversely extending sections 326 interconnect outboard portion 322 with inboard portion 324. A first end 328 of upper rail 320 is fixed to front corner assembly 38. A second end 330 of upper rail 320 is fixed to rear corner assembly 40. Inboard portions 324 may be fixed to inner panel reinforcement 44 as well.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A truck box, comprising:
    a floor pan;
    laterally extending floor cross-members fixed to said floor pan;
    cross-member close-out brackets shaped as open channels being fixed to said cross-members;
    a substantially vertically oriented inner side panel having each of said cross-member close-out brackets fixed thereto;
    another substantially vertically oriented inner side panel; and
    a header coupled to said inner side panel and said another inner side panel.

2. The truck box of claim 1 further including front and rear corner brackets fixed to said inner side panel at its ends as well as a rail longitudinally extending along an outboard side of said inner side panel, said rail having a first end fixed to said front corner bracket and a second end fixed to said rear corner bracket.

3. The truck box of claim 2 further including an inner panel reinforcement extending longitudinally substantially the entire length of said inner side panel, said inner panel reinforcement being fixed to said inner side panel to define a longitudinally extending closed volume.

4. The truck box of claim 3 wherein said rail has a center portion offset transversely from said first and second ends of said rail.

5. The truck box of claim 4 wherein said center portion of said rail is fixed to said inner side panel.

6. The truck box of claim 5 further including a reinforcement tube having an end fixed to one of said cross-member close-out brackets and another end fixed to another one of said cross-member close-out brackets, wherein a portion of said reinforcement tube between said ends is fixed to said rail.

7. The truck box of claim 6 wherein said reinforcement tube is substantially shaped as the letter U having two spaced apart substantially vertically extending portions and a substantially horizontally extending portion therebetween.

8. The truck box of claim 2 wherein said front corner bracket includes a slot in receipt of a portion of said rail.

9. The truck box of claim 2 wherein said front and rear corner brackets each include a plurality of stamped sheets fixed together.

10. A truck box, comprising:
front and rear corner brackets;
an inner side panel having a first end fixed to said front corner bracket and a second end fixed to said rear corner bracket;
a rail longitudinally extending substantially the entire length of said inner side panel and having a first end fixed to said front corner bracket and a second end fixed to said rear corner bracket, said rail having a center portion fixed to said inner side panel, said first and second ends of said rail being transversely offset and spaced apart from said inner side panel;
a floor pan;
another inner side panel; and
a header coupled to said inner side panel and said another inner side panel.

11. The truck box of claim 10 further including the floor pan having a plurality of spaced apart cross-members fixed thereto.

12. The truck box of claim 11 further including a plurality of cross-member close-out brackets, each being fixed to an end of one of said cross-members and said inner side panel.

13. The truck box of claim 12 further including a reinforcement tube having an end fixed to one of said cross-member close-out brackets and another end fixed to another one of said cross-member close-out brackets.

14. The truck box of claim 13 wherein a portion of said reinforcement tube between said ends is fixed to said rail.

15. The truck box of claim 14 wherein said reinforcement tube is substantially shaped as the letter U having two spaced apart substantially vertically extending portions and a substantially horizontally extending portion therebetween.

16. The truck box of claim 10 wherein said front and rear corner brackets each include a plurality of stamped sheets fixed together.

17. The truck box of claim 10 wherein said front corner bracket includes a slot in receipt of a portion of said rail.

18. The truck box of claim 10 wherein said rail is a tube.

19. The truck box of claim 10 further including an inner panel reinforcement extending longitudinally substantially the entire length of said inner side panel, said inner panel reinforcement being fixed to said inner side panel to define a longitudinally extending closed volume.

20. The truck box of claim 10 wherein said rail has a center portion offset transversely from said first and second ends of said rail.

* * * * *